Patented May 9, 1933

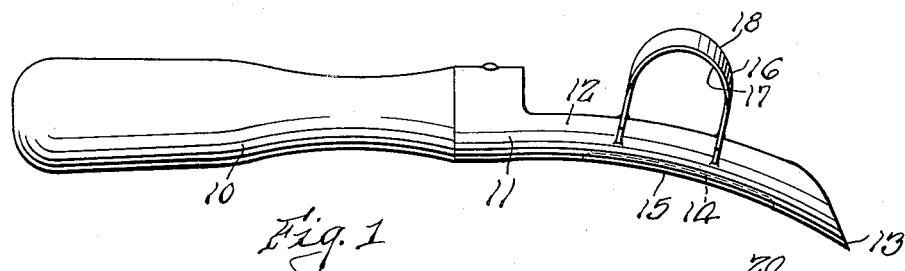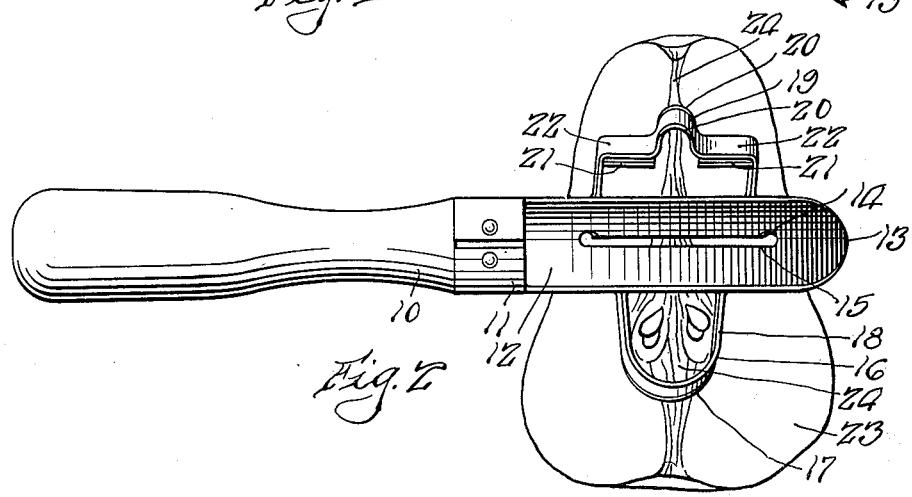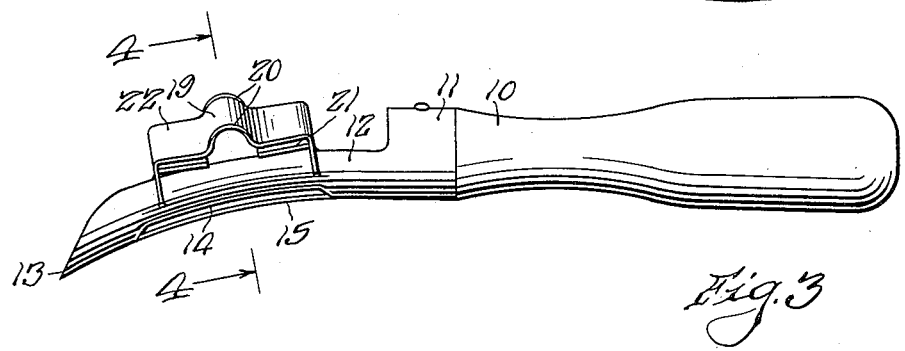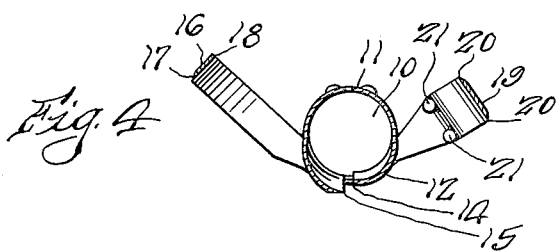

1,907,582

UNITED STATES PATENT OFFICE

DEAN G. RAY, OF WOODBURN, OREGON, ASSIGNOR TO SPECIAL EQUIPMENT COMPANY, OF PORTLAND, OREGON, A CORPORATION OF OREGON

PARING KNIFE

Application filed July 11, 1932. Serial No. 621,780.

The present invention has to do with a hand tool suitable for use in the canning art.

While the description of the invention herein disclosed will be confined more or less to the pear packing industry, the implement forming the subject matter of this invention has utility in respect to the treating of other fruit as, for example, apples and peaches.

During the past several years, a very marked change has occurred in the process of treating pears for canning. Where heretofore it has been customary to prepare the pear fruit for canning by manual operations only, i. e., peeling, splitting, and coring, mechanical pear peeling together with splitting and coring has become a practical and profitable undertaking. The machines for peeling, splitting and coring are not so perfect that they follow all the contours of an irregularly shaped fruit or one which is spotted or otherwise partially defective. Coring devices cannot possibly follow all of the irregularities of core formations in pears. Machines, however, now take the whole pear, snip off the stem end, split the pear, remove the peeling from the halves, cut out the core and the thready material extending from the stem end to the blossom end, and discharge the pear ready for immediate packing.

Because of the natural defects in the fruit itself and because of the great irregularity of pear fruit, certain halves of a limited number coming from the machines are imperfectly treated in a machine. This is not due to any fault of the machine but due to the irregularities of the pear structure itself. In the operation of the machines heretofore described, it has been customary to place one or more employees along the edges of a conveyor system carrying the halved pears to inspect the halved fruit as it passes by, and to correct any faults in machine operation due to the irregularity or imperfection of the fruit.

The present invention was intended to facilitate the operations of such employee or employees in that the tool herein described and illustrated is useful for peeling, coring, removing sections including the thready centers, and doing all things necessary to overcome the defects which have been discovered in imperfect fruit after the fruit has left the mechanical devices for its treatment.

Additionally, in California, but not so much in the Pacific Northwest, the treatment of the pears for canning is had by one employee. That is, one employee peels, splits, removes imperfections, and takes out the core. The halved fruit is then ready to go into the can. This operation is generally performed by a plurality of tools, each used independently of the other. First, the operator picks up a peeling knife. She displaces the peeling knife for a splitting knife and thereafter she removes the core with a third implement. Generally she has a fourth instrumentality for operating upon the thready portion of the fruit. Still another knife or device may be at her command for the removal of pits, bruises, or other defects which extend from the outer surface inwardly or from the flat face of the split portion outwardly.

The present instrumentality is suitable for performing all of these operations except the splitting of the pear, hence reducing the number of tools required to be at the command of the operative to two. Similarly, problems of like nature are encouraged in the apple packing industry as well as in the peach packing industry and the tool is suitable as an accessory in each of said industries.

The objects of the invention, therefore, comprises the provision of a new and improved tool particularly useful as an accessory where machine peeling of pears is had;

A new implement possessing large utility in the factory, kitchen, and elsewhere for paring and cleansing operations for fruit or tubers or the like;

A new and improved combination of peeling and cutting instrumentalities; and

A new and improved article of manufacture.

These objects, and such other objects as may hereinafter appear, are obtained by the novel construction, unique arrangement and improved combination of the several elements comprising the completed device, one form of which is illustrated in the accompanying drawing, hereby made a part of the specification of this application, and in which:

Figure 1 is a side elevation of a device embodying the invention;

Figure 2 is a plan view thereof;

Figure 3 is a side elevation opposite to that of Figure 1; and

Figure 4 is a transverse section taken on the line 4—4 of Figure 3.

Like reference characters are used to designate similar parts in the drawing and in the description of the invention hereinafter given.

The invention may comprise a metal part and a handle for the metal part, or if production suggests the fabrication of the metal part from the plurality of lesser units, this form of manufacture may be followed.

In the form of the invention shown, a handle 10, generally of wood, is employed. The handle is shaped for convenience in manipulation. To this is secured the tool portion proper. Any suitable fastening method or means maintaining the tool in a rigid connection upon the handle may be used.

The tool comprises, from the handle portion outwardly, a section 11 which is adapted to surround an end section of the handle and through which section fastening members are adapted to be forced into the handle 10 to secure the handle and tool together. In the form of an irregular semicircular or semi-cylindrical body there is an extension 12 from the first mentioned section of the tool. Such extension curves slightly, the curve therein gradually increasing and becoming sharp adjacent its end 13 which end 13 is pointed and scoop-like in nature. The back of the extension 12 is rounded and the rounded portion adjacent its center is slotted at 14.

The material at one side of the slot 14 is sharpened to form a blade 15, which blade is used for peeling. The material at the other side of the slot is offset inwardly of the cucullated section to allow for the free employment of the blade and to concurrently measure and limit the material which may be removed with the peeling. The pointed end 13 of the knife previously described is used to dig into the fruit to remove spots or bruises or other imperfections and to so arrange that in connection with the hand it may be used either as a scoop, or by rotation relatively to the fruit or by rotation of the fruit relatively to it to make a substantially round incision whereby to remove a portion of the fruit which is to be rejected.

At one edge of the body is a U-shaped member 16 which comprises a coring knife. Preferably that portion of the U which is to the back of the main body of the knife is sharpened at its edge 17. The other edge 18 is blunt. By sharpening the closed and curved section of this portion of the blade, a tool which is adapted to cut quickly through the material of a pear adjacent to the core is obtained. The operation includes cutting into the fruit from the flat surface thereof and movement longitudinally of the fruit beneath the core portion and withdrawal at the opposite end of the core. Seldom is the complete severance of the core required. On the contrary, the knife is usually employed, insofar as this section thereof is concerned, to remove some small sections of core material which have been left by the machine coring device. When so operating, the blade merely makes a shallow cut, lifting out the portion to be rejected. The action may well be designated a trimming operation.

On the opposite side of the body 12 is a smaller U-shaped blade 19, the cutting edge being directed from both ends 20 thereof so that such member may be used when being moved in either of the two possible directions for its operation. Adjacent to the cutting blade are guards or extensions of material, such as flanges 21, which are adapted to be turned up and prevent that portion of the U-shaped member which comprises the wings 22 at the side thereof from penetrating into the fruit. The flanges thus provide a means for limiting the penetration of the smaller U-shaped member 19 which is employed to move axially of the fruit 23 to trim any threads 24 which remain therein after the machine operation has been completed. A cut required to remove threads is longitudinally of the fruit and is generally of extended duration. The knife may be guided by the hand to determine the proper course for it to follow for the threads 24 in a pear seldom are coincident with the mathematical axis of the fruit but on the contrary are, in certain sections of their length, angular thereto.

Supplied with a device of the character indicated, an operative may pick up defective halved fruit with her left hand and by rotating the tool in her right hand by the handle thereof, may turn to the peeling section so that any section of peeling left upon the machine-treated fruit may be removed with a single paring movement, which movement may extend the length of the fruit if required.

At the same time the fruit is inspected for the purpose of the coring operation and by rotating the knife in the hand the core-removing instrumentality may be brought into play. For convenience, the smaller U-shaped member for removing the threaded section 24 of the core is sharpened at either end as previously indicated so that the operator may continue her rotation in one direction to remove the threads at one end of the fruit or reverse the direction for removing the threads at the opposite end of the fruit. The movement of the hand is then governed by whether the threads to be removed are between the core and the blossom end or the core and the stem end of the fruit.

If pits or bruises appear upon the exposed portions of the fruit, it is a simple matter to scoop them out with the point 13 of the device, or if they are of too great a size to be accomplished in this manner a stab may be made with the knife end and the pear then rotated relatively to the knife end to make an enlarged coniform depression therein.

As illustrated, the tool is readily cleansed and is the only implement required by an inspector of halved pears or of halved peaches or of peeled apples for trimming defects therefrom.

What is claimed as new and is desired to be secured by Letters Patent of the United States is:

1. A tool for the treatment of fruit or the like comprising a blade having a pointed end suitable for use as a scoop, the body of said blade being slotted and an edge of the material at said slot being sharpened to provide a paring instrumentality, an extension from one side of said body and in the form of a U, an edge thereof being sharpened to provide a blade suitable for longitudinal trimming of the core portion of the fruit, and a second U-shaped member upon the other side of said body, the second U-shaped member being of less dimension than the first mentioned U-shaped member and having a reduced area for the formation of cutting edges.

2. A tool for the trimming of fruit or the like comprising a body having a pointed end sharpened for use as a scoop, said body being slotted longitudinally at its center and an edge of the material about said slot being sharpened to provide a paring device, an extension from one side of said body and in the form of a U having an edge thereof sharpened for longitudinal trimming of the core of the fruit, and a second U-shaped member at the other side of said body, the second U-shaped member being of less dimensions than the first mentioned U-shaped member and having cutting edges at each side thereof.

DEAN G. RAY.